(12) United States Patent
Kang et al.

(10) Patent No.: US 11,048,917 B2
(45) Date of Patent: Jun. 29, 2021

(54) METHOD, ELECTRONIC DEVICE, AND COMPUTER READABLE MEDIUM FOR IMAGE IDENTIFICATION

(71) Applicant: Baidu USA LLC, Sunnyvale, CA (US)

(72) Inventors: Le Kang, Sunnyvale, CA (US); Yingze Bao, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 160 days.

(21) Appl. No.: 16/528,167

(22) Filed: Jul. 31, 2019

(65) Prior Publication Data

US 2021/0034842 A1 Feb. 4, 2021

(51) Int. Cl.
*G06K 9/00* (2006.01)
*G06T 7/73* (2017.01)
*G06N 20/00* (2019.01)

(52) U.S. Cl.
CPC ..... *G06K 9/00288* (2013.01); *G06K 9/00268* (2013.01); *G06K 9/00362* (2013.01); *G06N 20/00* (2019.01); *G06T 7/73* (2017.01); *G06T 2207/20081* (2013.01); *G06T 2207/30201* (2013.01)

(58) Field of Classification Search
CPC ........... G06K 9/00288; G06K 9/00268; G06K 9/00362; G06T 7/73; G06T 2207/20081; G06T 2207/30201; G06N 20/00
USPC ........................................................ 382/115
See application file for complete search history.

(56) References Cited

U.S. PATENT DOCUMENTS

| | | | | |
|---|---|---|---|---|
| 6,714,665 B1 * | 3/2004 | Hanna | ...................... | G06K 9/00 382/117 |
| 8,489,887 B1 * | 7/2013 | Newman | ................ | H04L 65/403 713/182 |
| 2008/0317339 A1 * | 12/2008 | Steinberg | .................. | G06T 5/50 382/167 |
| 2010/0239119 A1 * | 9/2010 | Bazakos | ............ | G06K 9/00261 382/103 |
| 2011/0007949 A1 * | 1/2011 | Hanna | ................ | G06K 9/00248 382/107 |
| 2011/0115917 A1 * | 5/2011 | Lee | ........................... | G06K 9/32 348/159 |

\* cited by examiner

*Primary Examiner* — Mark Roz
(74) *Attorney, Agent, or Firm* — Nixon Peabody LLP

(57) ABSTRACT

Embodiments of the present disclosure disclose a method, electronic device, and computer readable medium for image identification. The method comprises: acquiring an image comprising a person object for use as an input image; performing feature extraction on the input image using a feature extracting module of a trained human body identification model; and matching an extracted human body feature of the inputted image with a preset human body feature database, to identify the person object in the inputted image, wherein the human body identification model extracting features of human body images captured by cameras of different categories respectively using the feature extracting module, and the human body identification model identifying whether the human body images captured by the cameras of different categories are human body images of a given person based on the extracted features of the human body images. This method improves the accuracy of multi-camera human body re-identification.

11 Claims, 5 Drawing Sheets

METHOD, ELECTRONIC DEVICE, AND COMPUTER READABLE MEDIUM FOR IMAGE IDENTIFICATION

TECHNICAL FIELD

Embodiments of the present disclosure relate to the field of computer technology, specifically to the field of image processing technology, and more specifically to a method, electronic device, and computer readable medium for image identification.

BACKGROUND

In a monitoring scenario, such as smart retail or a large public place, a number of cameras of different types will generally be used to perform person detection and people counting. For example, a camera with high imaging quality may be used to capture clear face images at an entrance or passage for identifying a person entering the scenario, and a camera with low imaging quality mounted on ceiling, wall, or top ceiling indoors may be used to capture images of the person in the scenario. Due to limited imaging scope of each camera, it is often necessary to combine images captured by a plurality of cameras to perform a monitoring task.

Accurate person detection and matching on the images captured by cameras of a plurality of types in a given scenario can be performed to help to acquire an activity track of the person in the scenario, and achieve dynamic tracking of the person. However, due to different shooting angles and different imaging quality of different cameras, it is hard to achieve a high precision of multi-camera based automatic person detection and identification. Therefore, how to accurately identify an identity of the person based on the images of the person captured by the cameras of different types in the scenario has become a problem to be solved urgently.

SUMMARY

Embodiments of the present disclosure present a method, apparatus, electronic device, and computer readable medium for image identification.

In a first aspect, an embodiment of the present disclosure provides a method for image identification, including: acquiring an image including a person object for use as an input image; performing feature extraction on the input image using a feature extracting module of a trained human body identification model; and matching an extracted human body feature of the input image with a preset human body feature database, to identify the person object in the input image; wherein the human body identification model extracting features of human body images captured by cameras of different categories respectively using the feature extracting module, and the human body identification model identifying whether the human body images captured by the cameras of different categories are human body images of a same person based on the extracted features of the human body images.

In some embodiments, the method further includes: updating a motion track of the identified person object in the input image based on the input image.

In some embodiments, the method further includes: adding, in response to determining the human body feature of the input image successfully matching a target human body feature in the preset human body feature database, the human body feature of the input image to the preset human body feature database, and associating the human body feature with a given identity identifier which is associated with the target human body feature.

In some embodiments, the method further includes: providing, in response to determining the human body feature of the input image failing in matching the preset human body feature database, a corresponding identity identifier for the person object in the input image, and storing the human body feature of the input image and the corresponding identity identifier associatively in the preset human body feature database.

In some embodiments, the human body identification model is generated by: acquiring a sample data set, the sample data set including: sample human body images captured by the cameras of different categories, and identity identifier information of person objects included in the sample human body images; establishing a machine learning model including a feature extracting module and a determining module, extracting features of inputted different sample human body images respectively using the feature extracting module of the machine learning model, identifying whether the sample human body images captured by the cameras of different categories in the sample data set are human body images of a same person using the determining module of the machine learning model based on the extracted features of the sample human body images, determining an identification error of the machine learning model based on identity identifier information of person objects included in sample human body images inputted into the machine learning model, and iteratively adjusting the machine learning model based on the identification error, such that the identification error of the iteratively adjusted machine learning model meets a preset convergence condition; and determining the machine learning model with an identification error meeting the preset convergence condition for use as the human body identification model.

In some embodiments, the acquiring a sample data set includes: performing face detection on scenario images captured by the cameras of different categories, and identifying identities of person objects included in the scenario images based on detected human faces; and generating the sample data set based on the scenario images and the identified identities of the person objects included in the scenario images.

In some embodiments, the generating the sample data set based on the scenario images and the identified identities of the person objects included in the scenario images includes: segmenting an image of each person object included in the scenario images respectively from the scenario images, to generate one of the sample human body images; and generating identity identifier information of the each person object included in a corresponding sample human body image based on an identity identification result of the each person object included in the scenario images.

In some embodiments, the preset human body feature database is established by: extracting human body features of the sample human body images in the sample data set using the feature extracting module of the human body identification model; and associating the extracted human body features of the sample human body images with the identity identifier information of the each person object in the corresponding sample human body image, and storing the extracted human body features of the sample human body images and the identity identifier information of the each person object in the corresponding sample human body image in the preset human body feature database.

In a second aspect, an embodiment of the present disclosure provides an electronic device, including: one or more processors; and a storage apparatus configured to store one or more programs, where the one or more programs, when executed by the one or more processors, cause the one or more processors to implement the method for image identification according to the first aspect.

In a third aspect, an embodiment of the present disclosure provides a computer readable medium, storing a computer program thereon, where the program, when executed by a processor, implements the method for image identification according to the first aspect.

The method, electronic device, and computer readable medium for image identification of the above embodiments of the present disclosure acquire an image including a person object for use as an input image, then perform feature extraction on the input image using a feature extracting module of a trained human body identification model, and then match an extracted human body feature of the input image with a preset human body feature database, to identify the person object in the input image, wherein the human body identification model extracting features of human body images captured by cameras of different categories respectively using the feature extracting module, and the human body identification model identifying whether the human body images captured by the cameras of different categories are human body images of a same person based on the extracted features of the human body images, thereby accurately matching an identity of the person in the images captured by the cameras of different categories in a multi-camera scenario, and improving the accuracy of multi-camera human body re-identification.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

It should be noted that, the modification by "a" or "a plurality of" referred to in the present disclosure is meant to be illustrative and non-limiting, and should be construed as "one or more," unless otherwise expressly indicated in the context, as will be appreciated by those skilled in the art.

Figure 1:
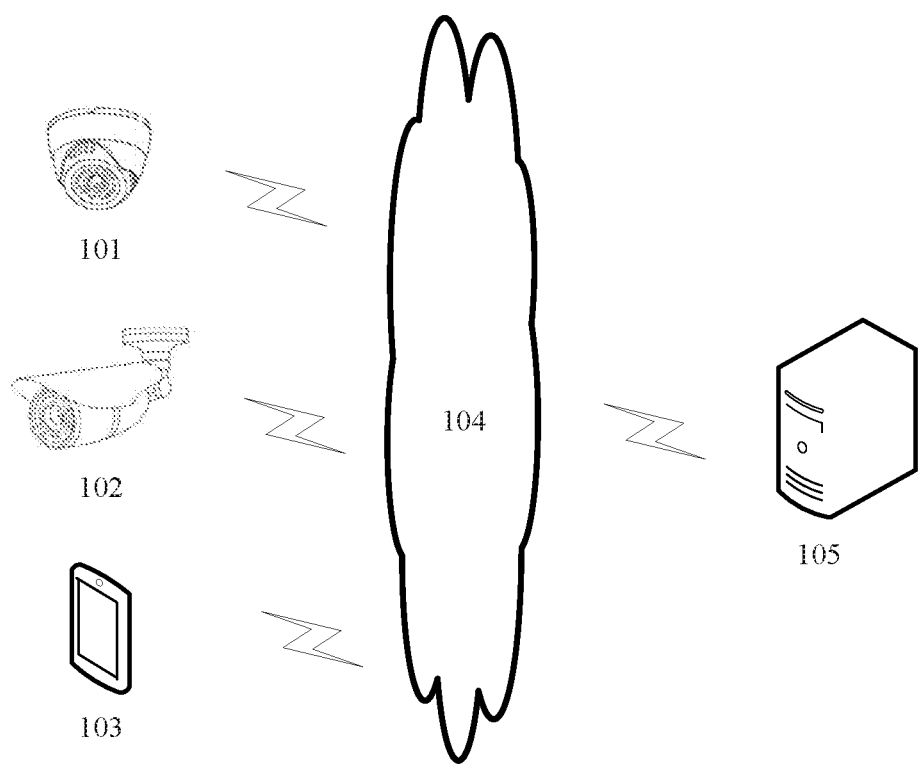
FIG. 1 is an architecture diagram of an exemplary system in which an embodiment of the present disclosure may be implemented.

FIG. 1 shows an exemplary system architecture 100 in which a method for image identification of the present disclosure may be applied.

As shown in FIG. 1, the system architecture 100 may include image inputting devices 101, 102, and 103, a network 104, and a server 105. The network 104 serves as a medium providing a communication link between the image inputting devices 101, 102, and 103, and the server 105. The network 104 may include various types of connections, such as wired or wireless communication links, or optical fibers.

The image inputting devices 101, 102, and 103 may be cameras of various types, for example, a people counting camera provided in a monitoring scenario, or a camera configured to capture human faces. The image inputting devices 101, 102, and 103 can capture images, and transmit the images to the server 105 via the network 104.

In an application scenario of the present disclosure, the image inputting devices 101, 102, and 103 may be a plurality of cameras of different types in a given scenario. The image inputting devices 101, 102, and 103 may have different imaging angles. The image inputting devices 101, 102, and 103 may have different imaging quality. Generally, an image inputting device of high imaging quality is expensive, while an image inputting device of relatively low imaging quality is inexpensive. Generally, there are a few image inputting devices of high imaging quality and many image inputting devices of low imaging quality in the given scenario.

The server 105 may be a back-end server configured to process the images captured by the image inputting devices 101, 102, and 103. The server 105 can acquire scenario images including person objects captured by the image inputting devices 101, 102, and 103, and identify persons in the images to determine identities of the person objects in the scenario.

The server 105 can further match the person objects in the images captured by the different image inputting devices 101, 102, and 103, to track motion tracks of the person objects, and further determine behavior bodies of various behaviors in the scenario in combination with identity identification results of the person objects in the images.

It should be noted that the server 105 may be hardware or software. When the server 105 is hardware, the server may be implemented as a distributed server cluster including a plurality of servers, or be implemented as a single server. When the server 105 is software, the server may be implemented as a plurality of pieces of software or software modules (e.g., a plurality of pieces of software packages or software modules for providing distributed services), or be implemented as a single piece of software or software module. This is not specifically limited here.

The method for image identification provided by an embodiment of the present disclosure may be executed by the server 105. Accordingly, the apparatus for image identification may be provided in the server 105.

t should be understood that the numbers of image putting devices, networks, and servers in FIG. 1 are merely illustrative. Any number of image putting devices, networks, and servers may be provided based on actual requirements.

Figure 2:
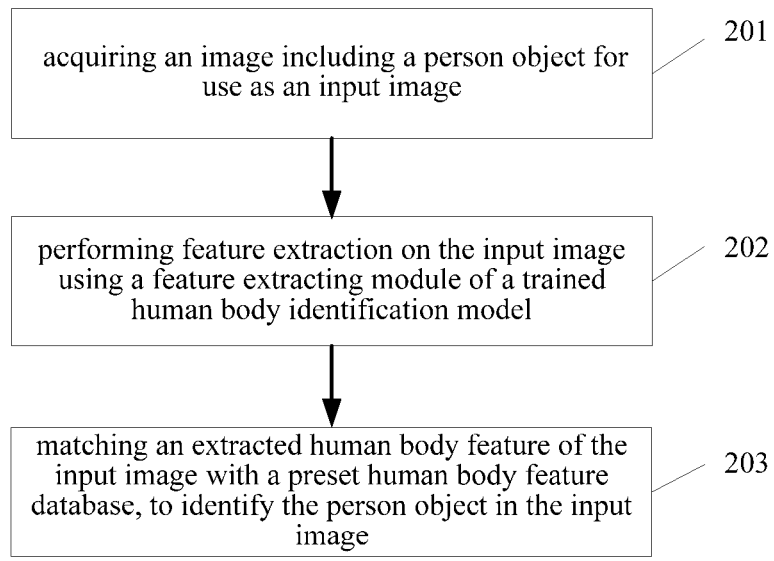
FIG. 2 is a flowchart of an embodiment of a method for image identification according to the present disclosure.

Further referring to FIG. 2, a process 200 of an embodiment of a method for image identification according to the present disclosure is shown. The method for image identification includes the following steps:

Step 201: acquiring an image including a person object for use as an input image.

In the present embodiment, an executing body of the method for image identification can acquire the image including the person object by connection to a camera capturing a person image. Alternatively, the executing body of the method for image identification can acquire an image including the person object and extracted after preprocessing, e.g., human body/face detection, and image segmentation, of the image captured by the camera. The executing body of the method for image identification can use the acquired image including the person object as the input image.

In an exemplary application scenario, the camera in a monitoring scenario can, after capturing a monitor image, transmit the monitor image to a remote server. The server can detect whether the monitor image includes a person object, and use the monitor image as the input image if detecting the monitor image including a person object. Here, the camera in the monitoring scenario may be cameras of various categories, e.g., a face capture camera provided at an entrance or passage, or a people counting camera configured to count people and mounted at a position, e.g., ceiling, or wall. The face capture camera can capture a clear human face and a part or all of a human body, while the people counting camera can capture an image of the human body.

Step 202: performing feature extraction on the input image using a feature extracting module of a trained human body identification model.

The human body identification model extracts features of human body images captured by cameras of different categories respectively using the feature extracting module, and the human body identification model identifies whether the human body images captured by the cameras of different categories are human body images of a same person based on the extracted features of the human body images.

Specifically, the human body identification model may include the feature extracting module configured to extract human body features. The feature extracting module may be a plurality of convolutional layers of a convolutional neural network, or a feature extracting module of a non-neural network. The human body identification model is configured to identify whether the human body images captured by the cameras of different categories are the human body images of a same person, i.e., the above human body identification model can match the human body images captured by the cameras of different categories based on an identity of the person. In some alternative implementations, the human body identification model may be a model established based on a multilayer neural network, and the above feature extracting module may be a network for extracting the human body features in the above human body identification model. Alternatively, the feature extracting module may include a plurality of convolutional layers. Each of the convolutional layers includes at least one convolution kernel configured to perform convolution operation on an image inputted into the convolutional layer, thereby realizing dimensionality reduction on image information. Alternatively, the feature extracting module may further include a feature post-processing layer. The feature post-processing layer can perform further refining processing on features extracted by the convolutional layer. The refining processing may include, but is not limited to, at least one of the following items: pooling, full connection, or L2 standardization. After feature post-processing, feature dimension is further reduced, and semantic information of the features is clearer, thereby facilitating subsequent feature comparison.

The above human body identification model may be a model that is pre-trained based on a sample data set. The sample data set may include the human body images captured by the cameras of different categories. In a training process, parameters of the human body identification model are adjusted to gradually enhance its precision of identifying whether person objects in a large number of human body images captured by the cameras of different categories are a same person object.

The cameras may be categorized based on one or more items of function, imaging approach, mounted position, or imaging quality, and the cameras of different categories may be cameras of different functions, imaging approaches, mounted positions, imaging quality, or the like.

In practice, the cameras of different categories may be, for example, multi-category cameras commonly used in the monitoring scenario, such as a camera configured to capture human faces, and a camera configured to perform people counting.

Here, the human body identification model can perform feature extraction on at least two human body images captured by the cameras of different categories respectively using the feature extracting module, and compare whether person objects in the at least two human body images are a same person based on the extracted features. If a similarity or matching degree between the extracted features of the at least two human body images is greater than a preset threshold, then the person objects in the at least two human body images captured by the cameras of different categories being the same person can be determined, or otherwise the person objects in the at least two human body images captured by the cameras of different categories not being the same person can be determined. Thus, after completing training the human body identification model, the feature extracting module can extract features that can be used to accurately distinguish whether persons in input images from the cameras of different categories are the same person, and then, different person objects can be accurately distinguished based on the features extracted using the feature extracting module in the trained human body identification model from the input images captured by the cameras of different categories.

Step 203: matching an extracted human body feature of the input image with a preset human body feature database, to identify the person object in the input image.

The above preset human body feature database may be pre-established, including a human body feature of a person object with a known identity. In the present embodiment, the human body feature of the input image can be matched with human body features in the preset human body feature database by various feature matching approaches. For example, a relative distance or similarity between the human body feature of the input image and the human body feature of each person object with a known identity in the human body feature database can be calculated successively, a human body feature in the preset human body feature database having a closest relative distance from the human body feature of the input image and the relative distance being less than a preset distance threshold is determined for as a human body feature successfully matching the human body feature of the inputted image, or a human body feature in the preset human body feature database having a highest similarity to the human body feature of the input image and the similarity being higher than a preset similarity threshold is determined for use as the human body feature successfully matching the human body feature of the inputted image, and the person object in the input image is determined as a person object associated with the human body feature successfully matching the human body feature of the input image.

Alternatively, the preset human body feature database can record identity identifiers of person objects associated with the human body features, and an identity identifier of the person object in the input image can be further determined.

Alternatively, the preset human body feature database can include a plurality of human body features of a person object. After matching the human body feature of the input image with the above preset human body feature database to determine a human body feature having a highest matching degree with the human body feature of the input image, other human body features of a person object associated with the human body feature having the highest matching degree can be further matched with the human body feature of the input image, and an identification result of the person object in the input image is obtained based on results of matching between the human body feature of the input image and a plurality of human body features of a same person object in the preset human body feature database.

An application scenario of the above embodiments of the present disclosure may be: pre-collecting a large number of human body images captured by cameras of at least two categories, such as a camera of a category A, and a camera of a category B, and annotating identity identifiers of person objects corresponding to the human body images, and training the human body identification model including the feature extracting module based on the collected abovementioned human body images. The human body identification model compares whether the human body images captured by the cameras of different categories, such as the camera of the category A, and the camera of the category B, are the human body images of a same person. When both the camera of the category A and the camera of the category B are configured to perform human body identification and tracking in a monitoring scenario, for a to-be-identified image including a person object captured by the camera of the category A or the camera of the category B, feature extraction may be performed using the feature extracting module of the trained human body identification model. Specifically, features outputted from the feature extracting module can be extracted, and then the extracted features are matched with the preset human body feature database, to determine the person object in the to-be-identified image being a person object associated with the successfully matched human body feature, thereby achieving person identification in the monitoring scenario.

The method for image identification of the above embodiments of the present disclosure acquires an image including a person object for use as an input image, then performs feature extraction on the input image using a feature extracting module of a trained human body identification model, and then matches an extracted human body feature of the inputted image with a preset human body feature database, to identify the person object in the inputted image, wherein the human body identification model extracting features of human body images captured by cameras of different categories respectively using the feature extracting module, and the human body identification model identifying whether the human body images captured by the cameras of different categories are human body images of a same person based on the extracted features of the human body images, thereby accurately matching an identity of the person in the images captured by the cameras of different categories in a multi-camera scenario, and improving the accuracy of multi-camera human body re-identification.

Figure 3:
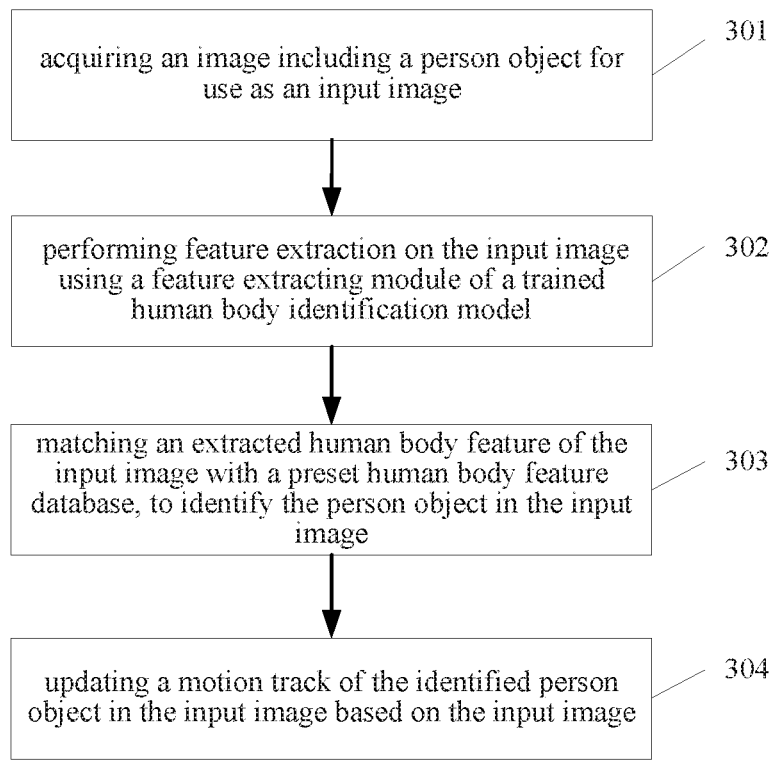
FIG. 3 is a flowchart of another embodiment of the method for image identification according to the present disclosure.

Referring to FIG. 3, a flowchart of another embodiment of the method for image identification according to the present disclosure is shown. As shown in FIG. 3, a process 300 of the method for image identification according to the present embodiment includes the following steps:

Step 301: acquiring an image including a person object for use as an input image.

Here, the image including the person object may be a person image captured by a camera. The image including the person object may be acquired by connection to the camera, or after acquiring the image captured by the camera, the image including the person object may be selected therefrom based on, e.g., human body detection.

Step 302: performing feature extraction on the input image using a feature extracting module of a trained human body identification model.

The human body identification model extracts features of human body images captured by cameras of different categories respectively using the feature extracting module, and the human body identification model identifies whether the human body images captured by the cameras of different categories are human body images of a same person based on the extracted features of the human body images.

The human body identification model may be a machine learning model, and is configured to identify whether the human body images captured by the cameras of different categories are the human body images of the same person. The human body identification model may be a neural network model, and accordingly, the feature extracting module may be a plurality of layers configured to extract image features in a neural network, for example, a plurality of convolutional layers of a convolutional neural network. Alternatively, the human body identification model may be a non-neural network model, such as random forest, or logistic regression, and accordingly, the feature extracting module may be a feature extracting module of a non-neural network.

The human body identification model may be obtained by training based on the human body images captured by the cameras of different categories, such that the feature extracting module thereof can effectively extract features capable of distinguishing between different person objects, from the images captured by the cameras of different categories.

Step 303: matching an extracted human body feature of the input image with a preset human body feature database, to identify the person object in the input image.

The human body feature of the input image can be matched with human body features of person objects with known identities in the preset human body feature database one by one, and a matching degree, such as a distance or similarity, between the features is calculated. Then, a human body feature successfully matching the feature of the input image can be determined based on the matching degree, and a person object associated with the successful matched human body feature is determined for use as the person object in the input image.

Step 301, step 302, and step 303 in the present embodiment are consistent with step 201, step 202, and step 203 in the above embodiments respectively. The description on step 201, step 202, and step 203 in the above embodiments may be referred to for specific implementations of step 301, step 302, and step 303, respectively. The description will not be repeated here.

Step 304: updating a motion track of the identified person object in the input image based on the input image.

In the present embodiment, after identifying the person object in the input image, the input image may be used as an image of a track point in the motion track of the person object. Capture time of the input image and a position of a camera capturing the input image can be acquired, and coordinate conversion on the position of the camera and a position of the person object in the input image is performed to positioning the person object in the input image, thereby determining a position of the identified person object in the input image at a capture moment, obtaining a track point of the person object, and then updating the motion track of the person object in the inputted image.

Alternatively, after identifying the person object in the input image, a marker, such as a sign board, for identifying a person position in the input image may be further identified, thereby determining the position of the person object in the input image. A relative position between the person object and the marker can be further determined based on the input image and internal parameters of the camera capturing the inputted image, and then an accurate position of the person object in the input image at the capture moment can be calculated.

The method of the present embodiment may be applied to a multi-camera scenario, person object identification can be performed respectively based on images captured by different cameras, and then the motion track of the identified person object is updated. Due to different imaging scopes of different cameras, a motion track of a person can be comprehensively and accurately tracked based on person identification results of images captured by a plurality of cameras in a large-scale scenario (such as a station, an airport, and a smart retail store).

As an example, an application scenario of the present embodiment may be: a face capture camera is provided at an entrance of the smart retail store. After capturing an image including a human face and at least a part of a human body by the face capture camera, a captured person can be identified using the method of the present embodiment, and then a track point corresponding to the "entrance" is added in the motion track of the identified person. Then, the person is identified and the motion track is updated using the method of the above embodiments based on images captured by other cameras (e.g., a people counting camera) in the smart retail store, such that a global motion track of the person in the scenario can be tracked based on images captured by cameras of different categories, and reliability of person behaviors (such as an item purchasing behavior, or a commodity returning behavior) identified by other approaches is verified with the help of the motion track.

Figure 4:
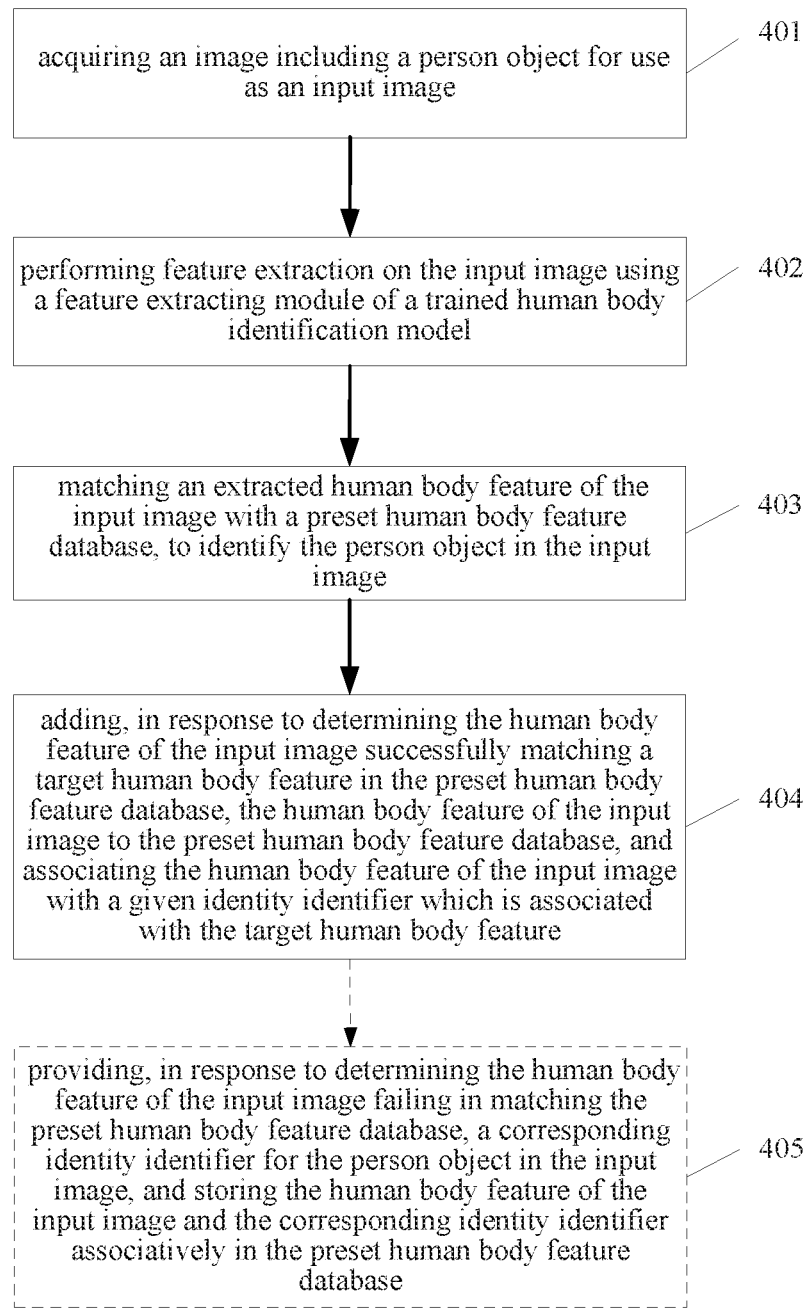
FIG. 4 is a flowchart of still another embodiment of the method for image identification according to the present disclosure.

Further referring to FIG. 4, a flowchart of another embodiment of the method for image identification according to the present disclosure is shown. As shown in FIG. 4, a process 400 of the method for image identification of the present embodiment includes the following steps:

Step 401: acquiring an image including a person object for use as an input image.

Step 402: performing feature extraction on the input image using a feature extracting module of a trained human body identification model.

Step 403: matching an extracted human body feature of the input image with a preset human body feature database, to identify the person object in the input image.

Step 401, step 402, and step 403 in the present embodiment are consistent with step 201, step 202, and step 203 in the above embodiments respectively. The description on step 201, step 202, and step 203 in the above embodiments may be referred to for specific implementations of step 401, step 402, and step 403, respectively. The description will not be repeated here.

Step 404: adding, in response to determining the human body feature of the input image successfully matching a target human body feature in the preset human body feature database, the human body feature of the input image to the preset human body feature database, and associating the human body feature of the input image with a given identity identifier which is associated with the target human body feature.

In the present embodiment, if a matching degree between the human body feature of the input image extracted in step 402 and one or more preset human body features in the preset human body feature database is greater than a preset matching degree threshold, then the preset human body feature can be determined as a target human body feature. An identity identifier associated with the target human body feature can be found out based on the preset human body feature database, and then the human body feature of the inputted image is also associated to the found identity identifier.

The above preset human body feature database may include a human body feature set of person objects with known identities. If an identity of the person object in the input image is identified based on the preset human body feature database, then the human body feature extracted from the input image can be added to the human body feature set of the identified person object. Thus, the human body feature database can be gradually expanded by collecting human body features while identifying a person identity based on images.

Alternatively, the process 400 of the method for image identification may further include the following steps:

Step 405: providing, in response to determining the human body feature of the input image failing in matching the preset human body feature database, a corresponding identity identifier for the person object in the input image, and storing the human body feature of the input image and the corresponding identity identifier associatively in the preset human body feature database.

If a matching degree between the human body feature of the input image extracted in step 402 and a human body feature associated with each person object in the preset human body feature database fails to reach the preset matching degree threshold, then matching failure can be determined. In this case, the person object in the input image being a person object, human body features of which are not collected, can be determined. The human body feature extracted in step 402 can be used as a human body feature of a new person object. The human body feature extracted in step 402 is provided with a corresponding identity identifier, and is then stored in the human body feature database. Thus, the human body feature of the new person object can be created in the preset human body feature database for subsequent image identification.

The present embodiment achieves establishing and expanding a human body feature database, and facilitates improving the success rate and accuracy rate of identifying a person object based on the human body feature database.

Figure 5:
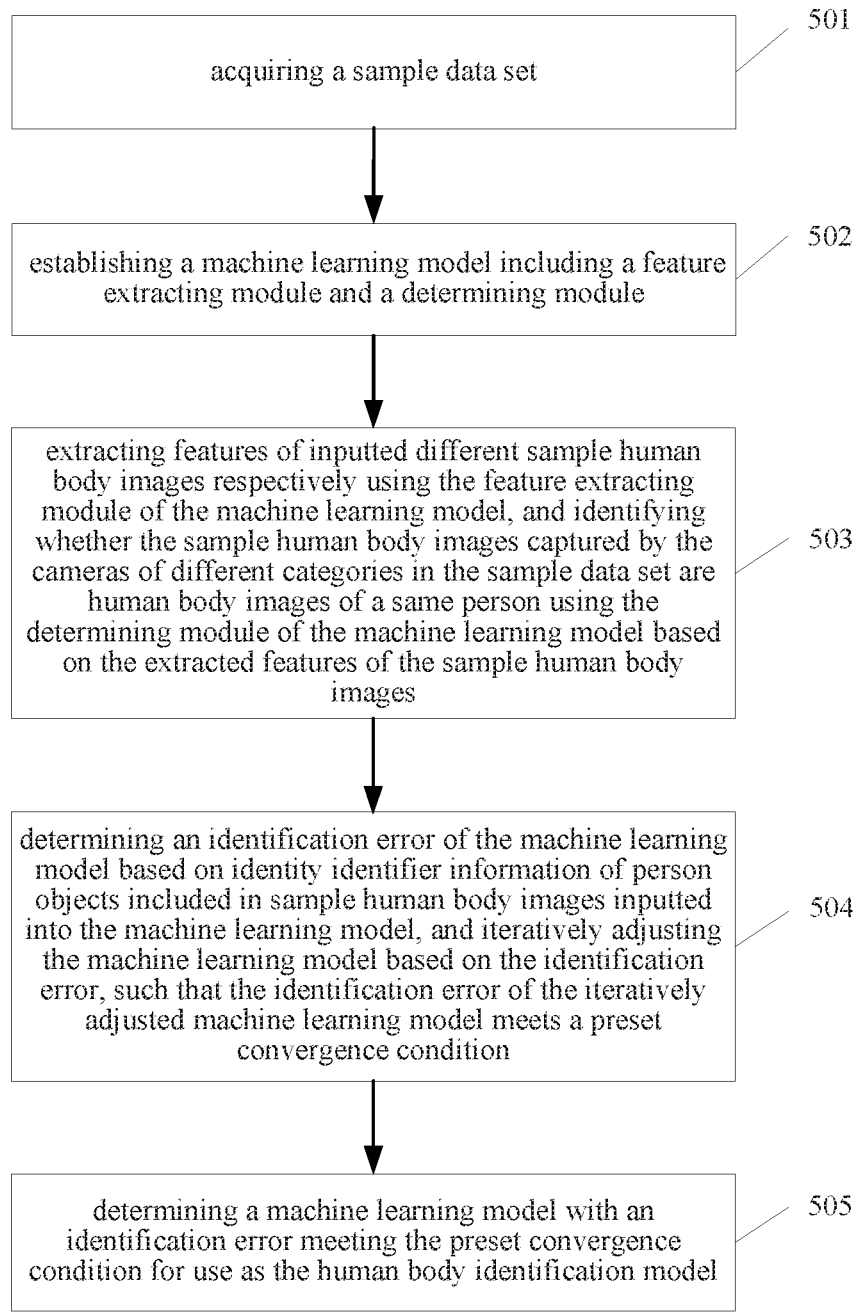
FIG. 5 is a schematic flowchart of a method of generating a human body identification model of the method for image identification according to the present disclosure.

In some alternative implementations of various embodiments described above in combination with FIGS. 2, 3, and 4, the human body identification model may be obtained by training using a machine learning method. Specifically, referring to FIG. 5, a human body identification model may be obtained by training following a process 500 of a method for generating a human body identification model shown in FIG. 5.

Step 501: acquiring a sample data set.

The sample data set includes: sample human body images captured by cameras of different categories, and identity identifier information of person objects included in the sample human body images. Person images captured by cameras of various categories may be collected for use as the sample human body images, or images of different persons may be segmented from the images captured by the cameras of various categories for use as the sample human body images, and a person object included in the collected sample human body images is provided with an identity identifier. A given person object in different sample human body images has a same given identity identifier, different person objects have different identity identifiers, and the sample data set is established accordingly. The categories of the cameras capturing the sample human body images may be further annotated to distinguish between the sample human body images captured by the cameras of different categories.

Alternatively, the sample data set may be acquired by: performing face detection on scenario images captured by the cameras of different categories, and identifying identities of person objects included in the scenario images based on detected human faces; and generating the sample data set based on the scenario images and the identified identities of the person objects included in the scenario images.

Specifically, for the scenario images captured by the cameras of different categories in a given scenario, a human face can be detected based on, e.g., facial feature point detection, and the detected human face can be identified. Then, an identity of the corresponding person object in the scenario images can be determined based on the identified human face, annotated, and then added to the sample data set as one of the sample human body images.

Further alternatively, an image of each person object included in the scenario images can be segmented respectively from the scenario images, to generate the sample human body image. Specifically, the image of each person object can be segmented based on a face detection result, to generate the sample human body image, and then the identity identifier information of the person object included in a corresponding sample human body image is generated based on an identity identification result of the person object included in the scenario images. In this way, the sample human body images and the corresponding identity identifier information can be obtained, and each of the sample human body images is a separate image of the person object, such that it is hard for the human body identification model to confuse features of different persons in a training process.

Thus, by face detection and identification on the scenario images, a large number of sample human body images can be automatically collected to establish the sample data set, thereby enhancing the efficiency of establishing the sample data set.

Step 502: establishing a machine learning model including a feature extracting module and a determining module.

Here, the feature extracting module is configured to extract a human body feature of an image, and the determining module is configured to determine whether human body images captured by cameras of different categories correspond to a same person object.

Alternatively, a neural network model including the feature extracting layer and the determining layer can be established. The feature extracting layer includes a plurality of convolutional layers, and the determining layer may include a classification layer.

Step 503: extracting features of inputted different sample human body images respectively using the feature extracting module of the machine learning model, and identifying whether the sample human body images captured by the cameras of different categories in the sample data set are human body images of a same person using the determining module of the machine learning model based on the extracted features of the sample human body images.

The feature extracting module can convert the sample human body images captured by the cameras of different categories into features of a given dimension. The determining module can determine whether the person objects in the sample human body images captured by the cameras of different categories are a same person object based on the features extracted by the feature extracting module. In each iteration of training, a current machine learning model can be configured to perform feature extraction on the sample human body images in the sample data set, and determine whether the sample human body images captured by the cameras of different categories are the human body images of the same person object, to obtain an identification result of the current machine learning model.

Step 504: determining an identification error of the machine learning model based on identity identifier information of person objects included in sample human body images inputted into the machine learning model, and iteratively adjusting the machine learning model based on the identification error, such that the identification error of the iteratively adjusted machine learning model meets a preset convergence condition.

The above sample data set includes the identity identifier information of the person objects included in the sample human body images, and when a determining result of the determining module is inconsistent with a desired determining result determined based on identity identifiers of the sample human body images, the determining module has wrong identification. Specifically, if identity identifiers of person objects included in two or more sample human body images inputted into the machine learning model are consistent, and the determining result of the determining module on the two or more sample human body images inputted into the machine learning mode is the included person objects not being a same person object, then an identification result of the determining module on the two or more sample human body images inputted into the machine learning mode is wrong identification; or if identity identifiers of persons included in the two or more sample human body images inputted into the machine learning mode are inconsistent, and the determining result of the determining module on the two or more sample human body images inputted into the machine learning mode is the included person objects being a same person object, then the identification result of the determining module on the two or more sample human body images inputted into the machine learning mode is also wrong identification. When the determining result of the determining module is consistent with the desired determining result determined based on the identity identifiers of the sample human body images, the determining module has correct identification.

The identification error of the machine learning model can be determined based on differences between the determining result of the determining module and the desired determining result determined based on the identity identifiers of the sample human body images. If the identification error does not meet the preset convergence condition, parameters of the machine learning model may be iteratively adjusted using a method, such as gradient descent, and back propagation method can be used to enhance the identification precision of the machine learning model. After adjusting the parameters of the machine learning model each time, a new identification error can be obtained based on the sample data set, and if the identification error still does not meet the preset convergence condition, then the parameters of the machine learning model can be further iteratively adjusted to re-identify and obtain the identification error. Thus, if the identification error meets the preset convergence condition after repeatedly iteratively adjusting the parameters a plurality of times, then the iteratively adjusting the parameters of the machine learning model can be stopped.

Step 505: determining a machine learning model with an identification error meeting the preset convergence condition for use as the human body identification model.

The preset convergence condition may be, e.g., the identification error being less than a preset threshold, or a convergence rate of the identification error in last few iterations being less than a preset range, or a number of iterations reaching a preset number of times.

Human body features capable of accurately categorizing a given person and accurately distinguishing between different persons can be extracted from images captured by cameras of various categories by a human body identification model which is obtained by training using the sample human body images having identity identifiers and captured by the cameras of different categories. The feature extracting module is adapted to extract human body features of the images captured in a multicategory camera scenario.

Further alternatively, the preset human body feature database may be established by: extracting human body features of the sample human body images in the sample data set using the feature extracting module of the human body identification model; and associating the extracted human body features of the sample human body images with the identity identifier information of the person object in the corresponding sample human body image, and storing the extracted human body features of the sample human body images and the identity identifier information of the person object in the corresponding sample human body image in the human body feature database.

After completing training the human body identification model, feature extraction on the sample human body images in the sample data set can be re-performed using the human body identification model. The identification error of the trained human body identification model is generally converged to a small range, wherein the feature extracting module can accurately extract the human body features. The feature extracting module of the trained human body identification model is configured to re-extract human body features of the sample data set, and can effectively expand the human body feature database. In addition, the sample data set generally has a large data size, such that human body features of a lot of person objects can be acquired, thereby contributing to further enhancing the identification rate and the identification precision of the method for image identification.

Figure 6:
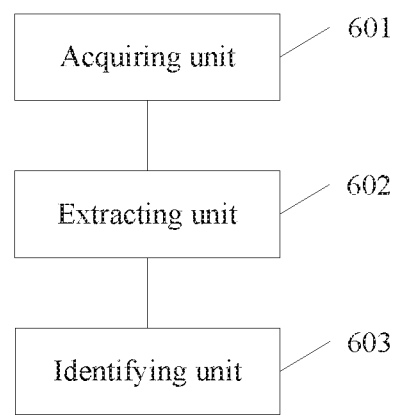
FIG. 6 is a schematic structural diagram of an embodiment of an apparatus for image identification according to the present disclosure.

Further referring to FIG. 6, as an implementation of the method shown in the above figures, an embodiment of the present disclosure provides an apparatus for image identification. The embodiment of the apparatus corresponds to the embodiment of the above method. The apparatus may be specifically applied to various electronic devices.

As shown in FIG. 6, the apparatus 60 for image identification of the present embodiment includes: an acquiring unit 601, an extracting unit 602, and an identifying unit 603. The acquiring unit 601 is configured to acquire an image including a person object as an input image; the extracting unit 602 is configured to perform feature extraction on the input image using a feature extracting module of a trained human body identification model, the human body identification model extracting features of human body images captured by cameras of different categories respectively using the feature extracting module, and the human body identification model identifying whether the human body images captured by the cameras of different categories are human body images of a same person based on the extracted features of the human body images; and the identifying unit 603 is configured to match an extracted human body feature of the input image with a preset human body feature database, to identify the person object in the input image.

In some embodiments, the apparatus 600 further includes: an updating unit configure to update a motion track of the identified person object in the input image based on the input image.

In some embodiments, the apparatus 600 further includes: an associating unit configure to add, in response to determining the human body feature of the input image successfully matching a target human body feature in the preset human body feature database, the human body feature of the input image to the preset human body feature database, and associate the human body feature of the input image with a given identity identifier which is associated with the target human body feature.

In some embodiments, the associating unit is further configure to: provide, in response to determining the human body feature of the input image failing in matching the preset human body feature database, a corresponding identity identifier for the person object in the input image, and store the human body feature of the input image and the corresponding identity identifier associatively in the preset human body feature database.

In some embodiments, the human body identification model is generated by: acquiring a sample data set, the sample data set including: sample human body images captured by the cameras of different categories, and identity identifier information of person objects included in the sample human body images; establishing a machine learning model including the feature extracting module and a determining module, extracting features of inputted different sample human body images respectively using the feature extracting module of the machine learning model, identifying whether the sample human body images captured by the cameras of different categories in the sample data set are human body images of a same person using the determining module of the machine learning model based on the extracted features of the sample human body images, determining an identification error of the machine learning model based on identity identifier information of person objects included in sample human body images inputted into the machine learning model, and iteratively adjusting the machine learning model based on the identification error, such that the identification error of the iteratively adjusted machine learning model meets a preset convergence condition; and determining the machine learning model with an identification error meeting the preset convergence condition for use as the human body identification model.

In some embodiments, the sample data set is acquired by: performing face detection on scenario images captured by the cameras of different categories, and identifying identities of person objects included in the scenario images based on detected human faces; and generating the sample data set based on the scenario images and the identified identities of the person objects included in the scenario images.

In some embodiments, the sample data set is further acquired by: segmenting an image of each person object included in the scenario images respectively from the scenario images, to generate one of the sample human body images; and generating identity identifier information of the person object included in a corresponding sample human body image based on an identity identification result of the person object included in the scenario images.

In some embodiments, the preset human body feature database is established by: extracting human body features of the sample human body images in the sample data set using the feature extracting module of the human body identification model; and associating the extracted human body features of the sample human body images with the identity identifier information of the each person object in the corresponding sample human body image, and storing the extracted human body features of the sample human body images and the identity identifier information of the each person object in the corresponding sample human body image in the preset human body feature database.

It should be understood that the units disclosed in the apparatus 600 correspond to the steps in the method described in FIG. 2, FIG. 3 and FIG. 4. Therefore, the operations and features described above for the method also apply to the apparatus 600 and the units included therein. The description will not be repeated here.

The apparatus 600 for image identification of the above embodiments of the present disclosure acquires an image including a person object for use as an input image by an acquiring unit, performs feature extraction on the input image by an extracting unit using a feature extracting module of a trained human body identification model, and matches an extracted human body feature of the input image with a preset human body feature database by an identifying unit to identify the person object in the input image, wherein the human body identification model extracting features of human body images captured by cameras of different categories respectively using the feature extracting module, and the human body identification model identifying whether the human body images captured by the cameras of different categories are human body images of a same person based on the extracted features of the human body images, thereby achieving accurately matching an identity of the person in the images captured by the cameras of different categories in a multi-camera scenario, and improving the accuracy of multi-camera human body re-identification.

Figure 7:
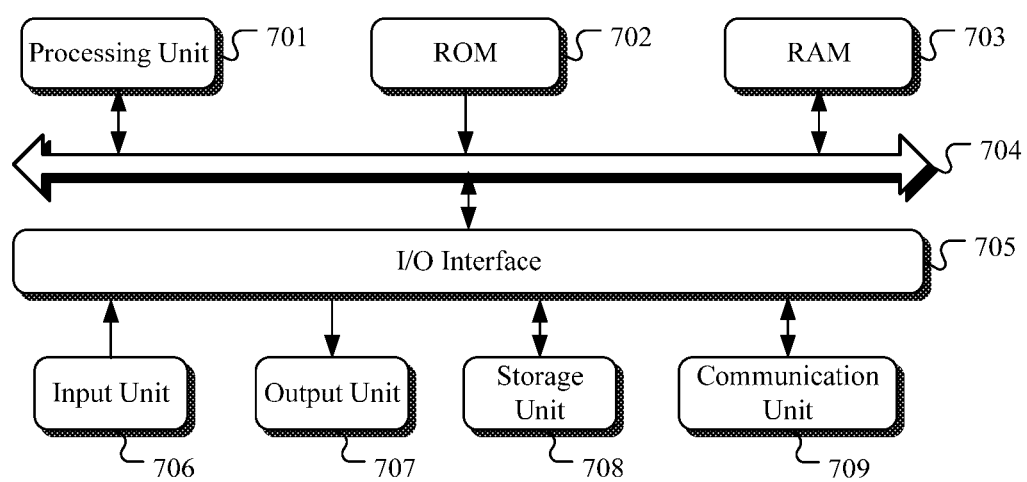
FIG. 7 is a schematic structural diagram of a computer system adapted to implement an electronic device of embodiments of the present disclosure.

Referring to FIG. 7 below, a structural schematic diagram adapted to implement an electronic device (e.g., the server shown in FIG. 1) 700 of embodiments of the present disclosure is shown. The electronic device shown in FIG. 7 is merely an example, and should not limit the functions and scope of use of the embodiments of the present disclosure.

As shown in FIG. 7, the electronic device 700 may include a processing unit (e.g., a central processing unit, or a graphics processing unit) 701, which may execute various appropriate actions and processes in accordance with a program stored in a read only memory (ROM) 702 or a program loaded into a random access memory (RAM) 703 from a storage unit 708. The RAM 703 further stores various programs and data required by operations of the electronic device 700. The processing unit 701, the ROM 702, and the RAM 703 are connected to each other through a bus 704. An input/output (I/O) interface 705 is also connected to the bus 704.

In general, the following units can be connected to the I/O interface 705: an input unit 706 including a touch screen, a touch tablet, a keyboard, a mouse, a camera, a microphone, an accelerometer, a gyroscope, or the like; an output unit 707 including a liquid crystal display (LCD), a speaker, a vibrator, or the like; the storage unit 708 including a hard disk, or the like; and a communication unit 709. The communication unit 709 may allow the electronic device 700 to exchange data with other devices through wireless or wired communication. While FIG. 7 shows the electronic device 700 provided with various units, it should be understood that the electronic device is not required to implement or be provided with all of the shown units. More or fewer units may be alternatively implemented or provided. Each block shown in FIG. 7 may represent a unit, or represent a plurality of units as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method as illustrated in the flow chart. In such an embodiment, the computer program may be downloaded and installed from a network via the communication unit 709, or be installed from the storage unit 708, or be installed from the ROM 702. The computer program, when executed by the processing unit 701, implements the above functions defined by the method of the embodiments of the present disclosure. It should be noted that the computer readable medium described in the embodiments of the present disclosure may be a computer readable signal medium or a computer readable storage medium, or any combination of the above two. An example of the computer readable storage medium may include, but is not limited to: an electrical, magnetic, optical, electromagnetic, infrared, or semiconductor systems, apparatuses or elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory device, or any suitable combination of the above. In the embodiments of the present disclosure, the computer readable storage medium may be any tangible medium containing or storing programs which may be used by a command execution system, apparatus or element or incorporated thereto. In the embodiments of the present disclosure, the computer readable signal medium may include data signal in the base band or propagating as parts of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium, including but not limited to: wired, optical cable, RF (radio frequency) medium etc., or any suitable combination of the above.

The computer readable medium may be included in the above electronic device; or a stand-alone computer readable medium without being assembled into the electronic device. The computer readable medium stores one or more programs. The one or more programs, when executed by the electronic device, cause the electronic device to: acquire an image including a person object for use as an input image; perform feature extraction on the input image using a feature extracting module of a trained human body identification model; and match an extracted human body feature of the input image with a preset human body feature database, to identify the person object in the input image; wherein the human body identification model extracting features of human body images captured by cameras of different categories respectively using the feature extracting module, and the human body identification model identifying whether the human body images captured by the cameras of different categories are human body images of a same person based on the extracted features of the human body images.

A computer program code for executing operations in the embodiments of the present disclosure may be compiled using one or more programming languages or combinations thereof. The programming languages include object-oriented programming languages, such as Java, Smalltalk, or C++, and also include conventional procedural programming languages, such as "C" language, or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer via any network, including local area network (LAN) or wide area network (WAN), or may be connected to an external computer (for example, connected via the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by software or hardware. The described units may also be provided in a processor, for example, described as: a processor including an acquiring unit, an extracting unit, and an identifying unit. The names of the units do not constitute a limitation to such units themselves in some cases. For example, the acquiring unit may be further described as "a unit configured to acquire an image including a person object for use as an input image."

The above description only provides explanation of the preferred embodiments and the employed technical principles of the present disclosure. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A method for image identification, comprising:
    acquiring an image including a person object for use as an input image;
    performing feature extraction on the input image using a feature extracting module of a trained human body identification model, wherein the human body identification model extracts features of human body images captured by different categories of cameras respectively using the feature extracting module, and identifies whether the captured human body images are human body images of a same person based on the extracted features of the human body images;
    matching an extracted human body feature of the input image with human body features stored in a preset human body feature database, to identify the person object in the input image;
    adding, in response to determining that the human body feature of the input image successfully matches a target human body feature in the preset human body feature database, the human body feature of the input image to the preset human body feature database, and
    associating the human body feature of the input image with a given identity identifier which is associated with the target human body feature.

2. The method according to claim 1, wherein the method further comprises:
    updating a motion track of the identified person object in the input image based on the input image.

3. The method according to claim 1, wherein the method further comprises:
    providing, in response to determining that the human body feature of the input image fails in matching the preset human body feature database, a corresponding identity identifier for the person object in the input image, and storing the human body feature of the input image and the corresponding identity identifier associatively in the preset human body feature database.

4. The method according to claim 1, wherein the human body identification model is generated by:
    acquiring a sample data set, the sample data set comprising: sample human body images captured by different categories of cameras, and identity identifier information of person objects included in the sample human body images;

establishing a machine learning model comprising a feature extracting module and a determining module, extracting features of inputted different sample human body images respectively using the feature extracting module of the machine learning model, identifying whether the sample human body images captured by different categories of cameras in the sample data set are human body images of a same person using the determining module of the machine learning model based on the extracted features of the sample human body images, determining an identification error of the machine learning model based on identity identifier information of person objects included in sample human body images inputted into the machine learning model, and iteratively adjusting the machine learning model based on the identification error, such that the identification error of the iteratively adjusted machine learning model meets a preset convergence condition; and determining the machine learning model with an identification error meeting the preset convergence condition for use as the human body identification model.

5. The method according to claim 4, wherein the acquiring a sample data set comprises:

performing face detection on scenario images captured by the cameras of different categories, and identifying identities of the person objects included in the scenario images based on detected human faces; and generating the sample data set based on the scenario images and the identified identities of the person objects included in the scenario images.

6. The method according to claim 5, wherein the generating the sample data set based on the scenario images and the identified identities of the person objects included in the scenario images comprises:

segmenting an image of each person object included in the scenario images respectively from the scenario images, to generate one of the sample human body images; and generating identity identifier information of the each person object included in a corresponding sample human body image based on an identity identification result of the each person object included in the scenario images.

7. The method according to claim 4, wherein the preset human body feature database is established by:

extracting human body features of the sample human body images in the sample data set using the feature extracting module of the human body identification model; and associating the extracted human body features of the sample human body images with the identity identifier information of the each person object in the corresponding sample human body image, and storing the extracted human body features of the sample human body images and the identity identifier information of the each person object in the corresponding sample human body image in the preset human body feature database.

8. An electronic device, comprising:
one or more processors; and
a storage apparatus configured to store one or more programs, wherein the one or more programs, when executed by the one or more processors, cause the one or more processors to:

acquire an image including a person object for use as an input image;

perform feature extraction on the input image using a feature extracting module of a trained human body identification model, wherein the human body identification model extracts features of human body images captured by different categories of cameras respectively using the feature extracting module, and identifies whether the captured human body images are human body images of a same person based on the extracted features of the human body images;

match an extracted human body feature of the input image with human body features stored in a preset human body feature database, to identify the person object in the input image;

adding, in response to determining that the human body feature of the input image successfully matches a target human body feature in the preset human body feature database, the human body feature of the input image to the preset human body feature database, and associating the human body feature of the input image with a given identity identifier which is associated with the target human body feature.

9. A computer readable medium, storing a computer program thereon, wherein the program executable by a processor to:

acquire an image including a person object for use as an input image;

perform feature extraction on the input image using a feature extracting module of a trained human body identification model, wherein the human body identification model extracts features of human body images captured by different categories of cameras respectively using the feature extracting module, and identifies whether the captured human body images are human body images of a same person based on the extracted features of the human body images;

match an extracted human body feature of the input image with human body features stored in a preset human body feature database, to identify the person object in the input image;

adding, in response to determining that the human body feature of the input image successfully matches a target human body feature in the preset human body feature database, the human body feature of the input image to the preset human body feature database, and associating the human body feature of the input image with a given identity identifier which is associated with the target human body feature.

10. The method according to claim 2, wherein the human body identification model is generated by:

acquiring a sample data set, the sample data set comprising: sample human body images captured by different categories of cameras, and identity identifier information of person objects included in the sample human body images;

establishing a machine learning model comprising a feature extracting module and a determining module, extracting features of inputted different sample human body images respectively using the feature extracting module of the machine learning model, identifying whether the sample human body images captured by different categories of cameras in the sample data set are human body images of a same person using the determining module of the machine learning model based on the extracted features of the sample human body images, determining an identification error of the machine learning model based on identity identifier information of person objects included in sample human body images inputted into the machine learning model, and iteratively adjusting the machine learning model based on the identification error, such that the identification error of the iteratively adjusted machine learning model meets a preset convergence condition; and determining the machine learning model with an identification error meeting the preset convergence condition for use as the human body identification model.

11. The method according to claim 3, wherein the human body identification model is generated by:

acquiring a sample data set, the sample data set comprising: sample human body images captured by different categories of cameras, and identity identifier information of person objects included in the sample human body images;

establishing a machine learning model comprising a feature extracting module and a determining module, extracting features of inputted different sample human body images respectively using the feature extracting module of the machine learning model, identifying whether the sample human body images captured by different categories of cameras in the sample data set are human body images of a same person using the determining module of the machine learning model based on the extracted features of the sample human body images, determining an identification error of the machine learning model based on identity identifier information of person objects included in sample human body images inputted into the machine learning model, and iteratively adjusting the machine learning model based on the identification error, such that the identification error of the iteratively adjusted machine learning model meets a preset convergence condition; and determining the machine learning model with an identification error meeting the preset convergence condition for use as the human body identification model.

\* \* \* \* \*